United States Patent Office 3,247,115
Patented Apr. 19, 1966

3,247,115
COMPLEX ESTER LUBRICANT AND
COMPOSITION
Herman D. Kluge, Fishkill, and Robert H. Krug, Cornwall, N.Y., and Paul A. Cantor, Covina, Calif., assignors to Texaco Inc., New York, N.Y., a corporation of Delaware
No Drawing. Filed Oct. 16, 1961, Ser. No. 145,478
3 Claims. (Cl. 252—56)

This invention relates to a complex synthetic ester lubricant and compositions thereof of improved low temperature, oxidation-corrosion resistant and thermal stability properties. More particularly, it pertains to a complex ester formed from a mixture of polyethylene and polypropylene glycols, dibasic acid and alkanol.

Complex esters produced from polypropylene glycol, dibasic acid and monohydric alcohol and produced from polyethylene glycol, dibasic acid and monohydric alcohol have been employed in the past as lubricants in high temperature engines such as combustion turbine engines, particularly those of the "prop-jet" type. These prior synthetic lubricants were especially adapted to use under high temperature conditions since they contained no metal additives and thus did not tend to leave any residue upon volatilization and further were of a high viscosity index.

However, a deficiency in the polyethylene glycol-dibasic acid-monohydric alcohol complex ester lubes was they have inferior low temperature properties and relatively high corrosiveness after being subjected to elevated temperatures. The corrosiveness is caused by products produced in the oxidative breakdown of the ester. When polypropylene glycol is substituted for polyethylene glycol in the foregoing ester, the resultant complex ester has improved low temperature and corrosion resistant properties but has substantially poorer stability than the polyethylene ester. Therefore, the polyethylene and polypropylene ester lubes were individually never completely satisfactory. In addition, we found, as would be expected, that a physical mixture of the complex polyethylene glycol ester with the polypropylene glycol ester compromise the good and the bad features of each, namely, that the physical mixture had a poorer low temperature and oxidation-corrosion resistant property than the polypropylene glycol ester but a better thermal stability. Further the physical mixture of complex esters had better low temperature and corrosion resistant properties while poorer thermal stability properties than its polyethylene glycol ester component.

We have discovered, and this forms the basis of our invention that when a mixture of polyethylene glycol and polypropylene glycol are reacted with a dibasic acid and alkanol, a complex ester lubricant is formed which not only has good low temperature properties, corrosion resistance superior to the polyethylene glycol complex ester and thermal stability superior to the polypropylene glycol complex ester, but surprisingly, is significantly superior to the physical mixture of the polyethylene glycol and polypropylene glycol complex esters described above in respect to low temperature properties.

More specifically, the new complex esters of the present invention may be broadly defined by the following general formula:

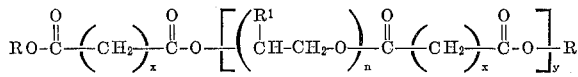

where R is an alkyl of from 1 to 18 carbons, $x$ is an integer from 0 to 10, $y$ is an integer from 1 to 50, and where consists of

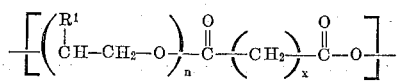

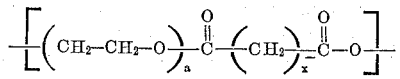

and

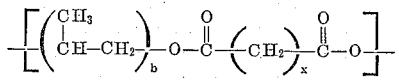

in a mole ratio of 1:1 to 20:1, where $a$ is an integer from 4 to 25 and $b$ is an integer from 6 to 34.

The complex ester of the invention may be prepared by reacting a mixture of polyethylene glycol and polypropylene glycol with a dibasic acid and then reacting the resultant mixture with an alkanol. Under advantageous conditions the two parts of the reaction are conducted at a temperature between about 200 to 450° F., advantageously in a mole ratio of glycol mixture to dibasic acid to monohydric alcohol of between about 1:1.1:0.22 and 1:1.9:2.0. The mole ratio of polyethylene glycol to polypropylene glycol in the glycol mixture is desirably between about 3:0.5 and 3:1.5.

Standard esterification procedures may be employed in preparing the novel ester, such as refluxing the reaction mixture at a temperature between about 200 and 450° F., desirably in the presence of an azeotroping agent for water, and removing the water by-product as overhead. Advantageously at least about 98% of the theoretical water produced in the esterification reaction should be removed as overhead in order to obtain significant yield of ester product. For high yields any of the standard esterification catalysts may also be employed.

Examples of azeotroping agents contemplated herein are the liquid alkylated aromatic hydrocarbons such as xylene, toluene and ethylbenzene. Examples of esterification catalysts useful in the preparation of the novel esters are sodium bisulfate, sulfuric acid and p-toluenesulfonic acid.

In addition to the foregoing the crude ester product may be subject to any of the prior art synthetic ester lube purification procedures if desired, such as percolating through surface active hydrated aluminum oxide (Porocel) in order to reduce acidity. The crude ester may be further or alternatively purified by fractional distillation to remove the unreacted reactants and reaction by-products as overhead. Under the preferred conditions the crude ester product is stripped of all products having a distillation point of less than about 400° F. at a pressure of 20 mm. Hg. The ester product contemplated herein therefore has a boiling point greater than about 400° F. at 20 mm. Hg.

The polyethylene glycols employed in the preparation of the esters of the invention are of a molecular weight between about 200 and 1000 and have the structural formula HO—$(CH_2$—$CH_2$—$O)_a$H where $a$ is an integer between about 4 and 25. Specific examples of the polyethylene glycols contemplated herein are those having a molecular weight of 200, 300, 400, 600, 750 and 1000 and mixtures thereof.

The polypropylene glycols contemplated herein have a molecular weight between about 400 and 2000 and are of the general formula

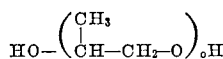

where $b$ is an integer from about 6 to 34. Specific examples of the polypropylene glycols contemplated herein are those of a molecular weight of 400, 750, 1200 and 2000.

Illustrative examples of the dibasic acids which may be employed in the synthesis of a complex ester of the present invention are those of from 2 to 12 carbons, such as oxalic, succinic, suberic and sebacic acids.

The monohydric alcohol reactants employed are the alkanols of from 1 to 18 carbons such as propyl alcohol, isoamyl alcohol, 2-methylhexyl alcohol and decyl alcohol.

The novel esters of the invention in addition to being suitable as lubricants alone may be used in combination with mineral oil lubricants or other synthetic ester lubricants such as the simple ester lubricants of an aliphatic dicarboxylic acid and a monohydric alcohol of the formula $R'OOC(CH_2)_vCOOR'$ where $R'$ is an alkyl radical of from 1 to 12 carbon atoms and $v$ is an integer between about 4 and 10. When the esters of the invention are used in combination with simple syntheic esters, the amount of complex ester employed in the combination is from between about 5 to 60 wt. percent and simple ester from about 95 to 40 wt. percent. Examples of the simple esters contemplated herein are the ester products resulting from the reaction of aliphatic dicarboxylic acids with monohydric alcohols such as di-isoctyl azelate, di-2-ethylhexyl sebacate, di-2-ethylhexyl azelate, di-2-ethylhexyl adipate, dilauryl azelate and di-sec-amyl sebacate. A preferred simple ester-complex ester composition comprises esters of the invention in combination with 2-ethylhexyl sebacate. In addition to the simple esters any of the standard synthetic ester lubricant additives such as phenothiazine are compatible therewith.

As heretofore stated our novel complex esters combine good thermal stability and oxidation-corrosion resistance with superior low temperature properties. By thermal stability we mean resistance to decomposition of the ester under elevated temperature conditions. A common test for measuring thermal stability is specification "DERD/2487 Issue 3" of the British Ministry of Supply (Air Division) which consists of measuring the viscosity change of the oil after being subjected to a 24 hour heating period at 538° F. The greater the change in viscosity the greater the decomposition.

In respect to measuring the oxidation-corrosion resistant characteristics of the ester lube, a common means is utilizing the test described in the U.S. military specification MIL–L–7808D. In this test strips of various metals are immersed in the ester lube which is heated to a temperature of 347° F. for a period of 72 hours. The weight loss of the metal strips at the end of the heating period is a measure of the oxidation-corrosion resistance of the test lube, the greater the weight loss the less the oxidation-corrosion resistance.

Ester lubes of good low temperature properties are those which do not tend to solidify or substantially increase viscosity after being subjected to low temperatures, e.g., less than 0° F., for a period of time. Specifically, we have found that the complex esters of the invention have significantly lower viscosities after being subjected to a temperature of −65° F. for a period of 12 hours than a mere physical mixture of the esters of polyethylene glycol and polypropylene glycol. Good low temperature property is important particularly for lubricants used in high flying aircraft which are often exposed to temperatures substantially below 0° F. for long periods of time. It would be obviously undesirable to have a lubricant whose viscosity is materially and permanently increased after being subjected to low temperatures.

The invention is further illustrated by the following examples:

*Example I*

This example illustrates the preparation of a complex ester of the invention.

To a 50 gallon stainless steel reactor there was added 100 lbs. sebacic acid (0.495 lb. mole), 49 lbs. (0.245 mole) polyethylene glycol of a molecular weight of 200, 98.4 lbs. (0.082 mole) of polypropylene glycol of a molecular weight of 1200, 70 lbs. xylene and 3.6 lbs. sodium bisulfate. The reaction mixture was refluxed until water ceased to evolve and 46.9 lbs. (0.360 mole) of 2-ethylhexanol was added to the reaction mixture and refluxing was continued until water ceased to evolve. The total reflux period was 7 hours and refluxing was conducted at a temperature from 233 to 335° F. At the end of the reaction period the reaction mixture was cooled to ambient temperature, filtered through Porocel. The filtrate was fractionally stripped at a pot temperature of 400–407° F. under a pressure of 2–3 mm. Hg and 245 lbs. of complex ester was recovered as residue. The polyethylene glycol-polypropylene glycol-sebacic acid-ethylhexanol complex ester was analyzed and found to have the following properties:

| Tests: | Results |
|---|---|
| Peroxide No. | 0.99 |
| Neut. No | 1.35 |
| OH No. | 12 |
| Sp. Gr., 60/60° F. | 1.0149 |
| Water, percent | 0.031 |
| Flash, COC, ° F. | 455 |
| Kin. vis., cs., | |
| 100° F. | 190.4 |
| 210° F. | 31.0 |
| Pour Pt., ° F. | −55 |
| Color, ASTM | 8 |

*Example II*

This example further illustrates the preparation of a complex ester of the invention.

To a 12 liter flask there was added 1200 g. (1 mole) of polypropylene glycol of a molecular weight of 1200, 400 g. (2 moles) of polyethylene glycol of a molecular weight of 200, 909 g. (4.5 moles) of sebacic acid, 2000 ml. of xylene and 40 g. sodium bisulfate. The reactants were refluxed until water ceased to evolve and then 430 g. (3.3 moles) of 2-ethylhexanol were added. The refluxing was continued while removing water until the Neut. No. (neutralization number) reached a value less than 2. The reaction mixture was cooled, filtered through Porocel and stripped at a temperature of about 400° F. under 20 mm. Hg pressure. The distillation residue was identified as the complex ester product of polyethylene glycol-polypropylene glycol-sebacic acid-2 ethylhexanol and had the following properties:

| Tests: | Results |
|---|---|
| Kin. vis., cs., | |
| 100° F. | 235.9 |
| 210° F. | 35.4 |
| Pour pt., ° F. | −40 |
| Flash pt., ° F. | 480 |
| Fire pt., ° F. | 525 |
| OH No. | 10 |
| Neut. No. | <2 |

*Example III*

This example illustrates the lubricating characteristics of a composition of the complex esters contemplated herein.

An ester composition consisting of the complex ester of Example I (Ester A), 2-ethylhexyl sebacate (simple ester) and a standard anti-oxidant for ester lubricants, phenothiazine, was subjected to standard lubricant tests.

The test data and results indicating the good lubricant properties of the test composition are reported below:

| Description | Ester A | |
|---|---|---|
| Composition, wt. percent: | | |
| Ester A | 33 | |
| 2-ethylhexyl sebacate | 66 | |
| Phenothiazine | 1 | |
| TESTS | | |
| Kin. vis. at— | | |
| 210° F | 7.62 | |
| 100° F | 34.9 | |
| −40° F | 8,849 | |
| −40° F. after 12 hr./−65° F | 9,356 | |
| Flash point, °F | 465 | |
| Neut. No | 0.26 | |
| SOD Pb Corr., mg./sq. in | +0.1 | |
| | Cu | Cd |
| Oxid-corr. test, 284° F./22 hr.: | | |
| Corr., mg./sq. cm | −0.02 | +0.01 |
| Vis. inc., percent | 2.9 | 2.6 |
| Neut. No. inc | 0.08 | 0.09 |
| Br. thermal stability test—Vis. change, percent: | | |
| 536° F./6 hr | −9.2 | |
| 12 hr | −7.7 | |
| 18 hr | −9.4 | |
| 24 hr | −12.6 | |
| I.A.E. gear failure load, test, lbs.: | | |
| 110° F./2,000 r.p.m | 75; 80 | |
| Ref. oil | 56 | |
| 110° F./6,000 r.p.m | 40; 45 | |
| Ref. oil | 45 | |

*Example IV*

This example illustrates the outstanding low temperature properties of the complex ester of the invention.

The complex ester of Example I, Ester A, which is the mixed glycol complex ester and a physical mixture of comparative Esters B and C were subjected to a low temperature test. Ester B is a complex ester derived from the reaction of polyethylene glycol of a molecular weight of 200 sebacic acid and 2-ethylhexanol in a mole ratio of 1:2:2. Ester C is a complex ester formed from the reaction of polypropylene glycol of a molecular weight of 1200, sebacic acid and 2-ethylhexanol.

The test consisted of cooling the ester composition to a temperature of −40° F., measuring its viscosity at −40° F. and then maintaining the temperature for a period of 12 hours at −65° F. At the end of the 12 hour period the viscosity is again measured at −40° F. The smaller the viscosity change the better the low temperature stability of the ester. In order to stimulate actual lubricant compositions the test esters were tested in combination with a simple ester lubricant, that is, 2-ethylhexyl sebacate, and the anti-oxidant phenothiazine. The test data and results are reported below:

| Description | Ester A | Ester B+C |
|---|---|---|
| Composition, Wt. percent: | | |
| Ester A | 33 | |
| Esters B+C | | 59 (49B+10C) |
| 2-Ethylhexyl sebacate | 66 | 40 |
| Phenothiazine | 1 | 1 |
| TESTS | | |
| Kin. vis.: | | |
| 210° F | 7.62 | 7.25 |
| 100° F | 34.9 | |
| −40° F | 8,849 | 9,570 |
| −40° F. after 12 hrs. at −65° F | 9,356 | Solid |

As can be seen from the above composition containing Ester A, the ester of the invention, has a significantly better low temperature property than the comparative composition containing Ester B+C in that the former remains a liquid after being subjected to −65° F. for a 12 hour period while the latter becomes a solid.

We claim:

1. A synthetic ester lubricant composition comprising between about 95 and 40 wt. percent of a simple ester of the formula $R^2OOC(CH_2)_vCOOR^2$ where $R^2$ is an alkyl radical of from 1 to 12 carbon atoms and $v$ is an integer from 4 to 10 and between about 5 and 60 wt. percent of a complex ester of the formula

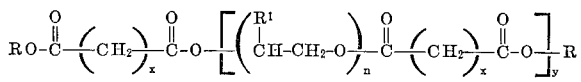

where R is an alkyl of from 1 to 18 carbons, $x$ is an integer from 0 to 10, $y$ is an integer from 1 to 50, and where

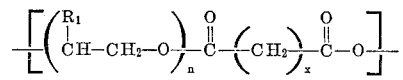

consists of both

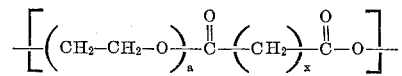

and

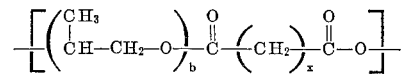

in a mole ratio of 1:1 to 20:1, where $a$ is an integer from 4 to 25 and $b$ is an integer from 6 to 34.

2. A synthetic lubricant composition in accordance with claim 1 wherein said simple ester is 2-ethylhexyl sebacate.

3. A synthetic ester lubricant in accordance with claim 1 wherein $R^2$ is 2-ethylhexyl, $x$ is 8, where said mole ratio is from 1:1 to 3:1, where $a$ is about 8 and where $b$ is about 29.

References Cited by the Examiner

UNITED STATES PATENTS

| 2,499,984 | 3/1950 | Beavers et al. | 260—485 |
|---|---|---|---|
| 2,628,974 | 2/1953 | Sanderson | 252—56 |
| 2,820,815 | 1/1958 | Matuszak et al. | 260—485 |
| 2,839,571 | 6/1958 | Johnston et al. | 260—485 |
| 2,902,463 | 9/1959 | Johnston et al. | 260—48 |
| 3,016,353 | 1/1962 | Matuszak | 252—56 |
| 3,029,204 | 4/1962 | Matuszak et al. | 252—56 |
| 3,057,892 | 10/1962 | De Groote | 252—56 |

FOREIGN PATENTS

| 1,256,927 | 2/1961 | France. |
|---|---|---|
| 683,803 | 12/1952 | Great Britain. |
| 687,346 | 2/1953 | Great Britain. |
| 824,249 | 11/1959 | Great Britain. |
| 867,543 | 5/1961 | Great Britain. |

DANIEL E. WYMAN, *Primary Examiner.*

JULIUS GREENWALD, *Examiner.*